United States Patent [19]

Chain

[11] 4,214,787
[45] Jul. 29, 1980

[54] DRAG REDUCING APPARATUS

[76] Inventor: Frank Chain, Rte. 1, Box 40, Oakwood, Okla. 73658

[21] Appl. No.: 858,113

[22] Filed: Dec. 7, 1977

[51] Int. Cl.² .............................................. B62D 35/00
[52] U.S. Cl. ..................................... 296/1 S; 105/2 R
[58] Field of Search .................. 296/1 S, 91; 105/2 B, 105/2 R

[56] References Cited

U.S. PATENT DOCUMENTS

| 2,146,297 | 2/1939 | Huet | 105/2 R |
|---|---|---|---|
| 2,149,161 | 2/1939 | Byrnes | 105/2 R |
| 2,781,226 | 2/1957 | Tydon | 296/28 M |
| 3,010,754 | 11/1961 | Shumaker | 296/1 S |
| 3,960,402 | 6/1976 | Keck | 296/1 S |
| 4,006,932 | 2/1977 | McDonald | 296/1 S |

Primary Examiner—John J. Love
Assistant Examiner—Donn McGiehan
Attorney, Agent, or Firm—Dunlap, Codding & McCarthy

[57] ABSTRACT

A pair of trim panels are pivotally connected to the rear end of a vehicle to reduce air drag when the vehicle is in motion, with control apparatus connected between each trim panel and the rear end of the vehicle for maintaining the trim panel in an operating position when the vehicle is moving at a rate exceeding a predetermined minimum velocity, and for maintaining the trim panels in a storage position when the vehicle is moving at a rate not exceeding the minimum velocity.

12 Claims, 6 Drawing Figures

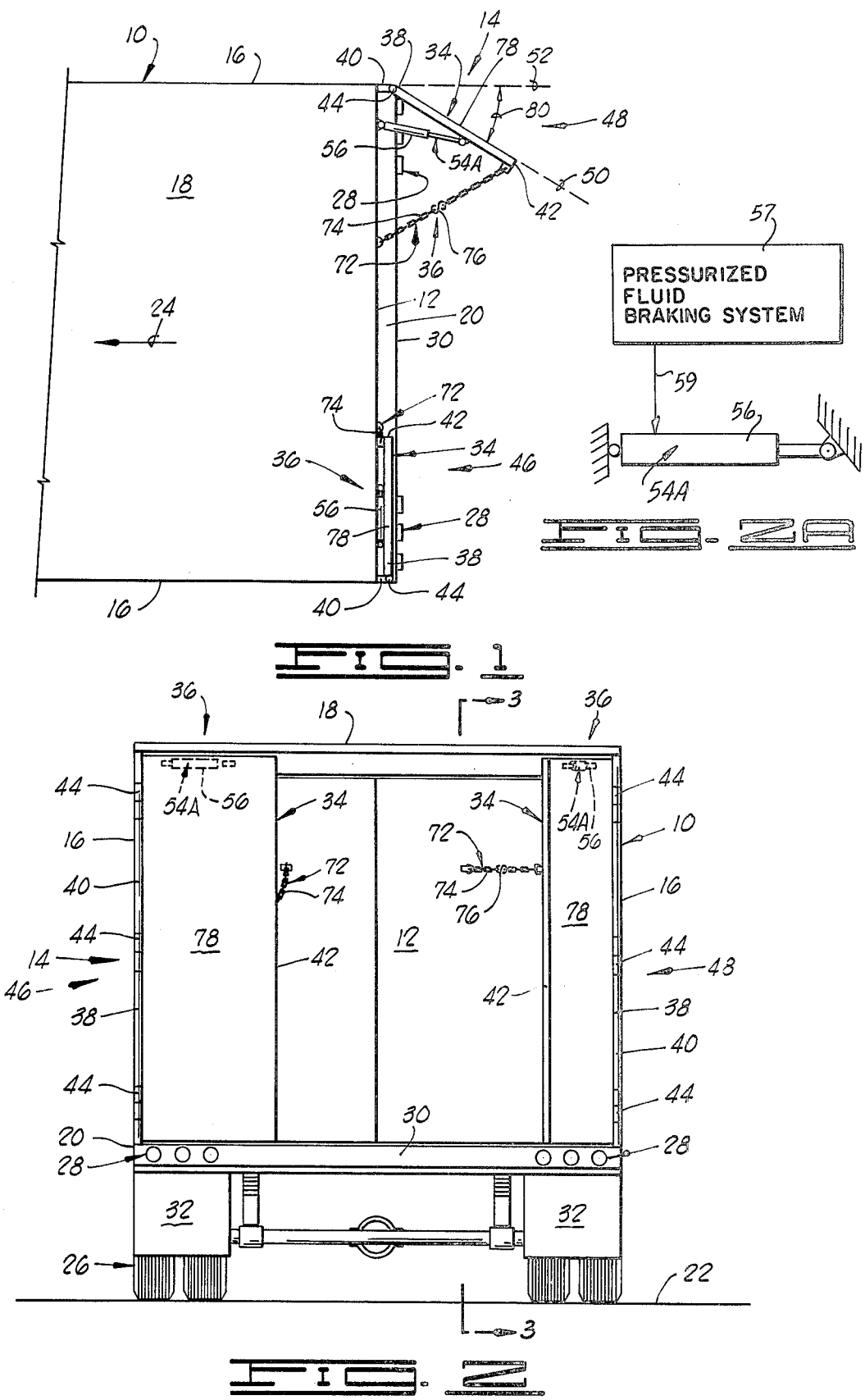

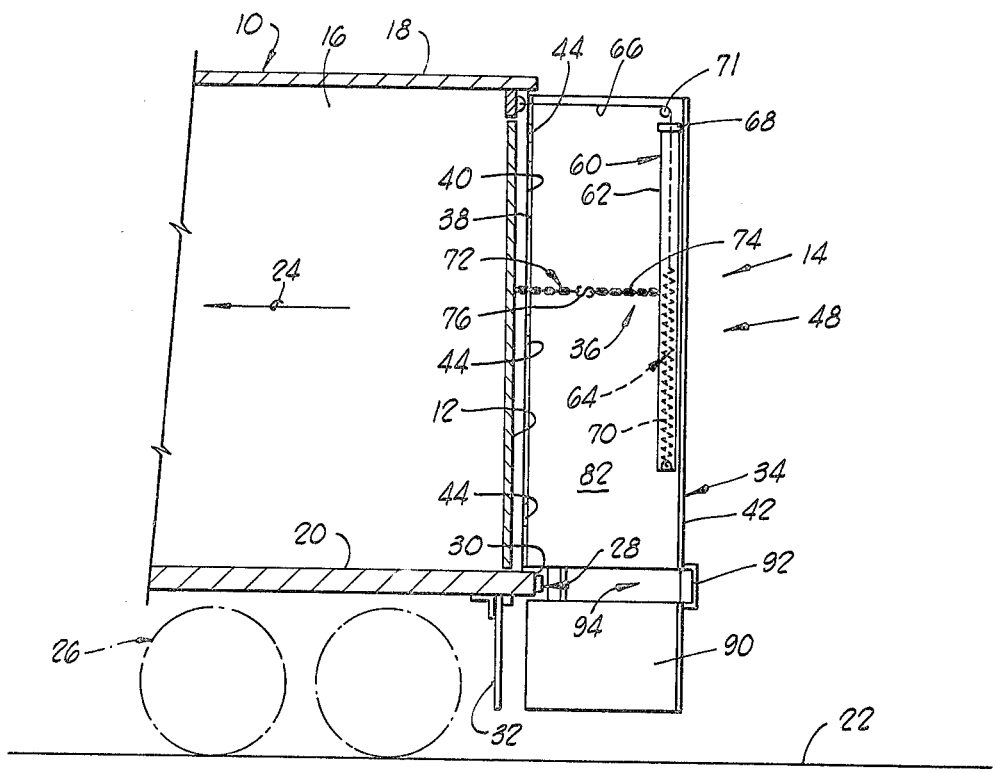
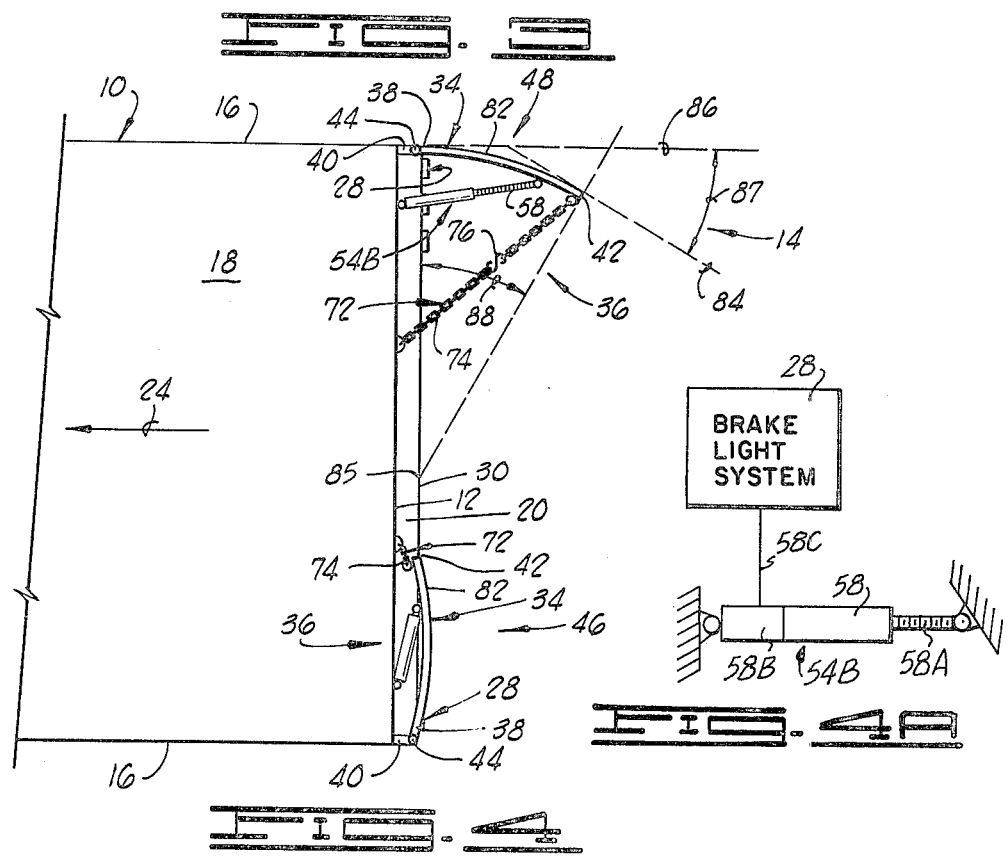

DRAG REDUCING APPARATUS

BACKGROUND OF THE INVENTION

1. Field of the Invention

The present invention relates generally to air flow control rearwardly of a moving vehicle, and more particularly but not by way of limitation, to reducing air drag rearwardly of a vehicle having a rectangularly shaped rear end.

2. Description of the Prior Art

It is well known that as a vehicle, such as a conventional closed body trailer or the like, travels over a roadway, a significant amount of air drag on the vehicle results since movement of the vehicle through the atmosphere tends to create an area of lower pressure rearwardly thereof. The resulting area of highly turbulent air induces drag on the vehicle and, if the roadway is wet, dusty or covered with debris, creates a spray or a cloud thereof rearwardly of the vehicle. Such conditions can significantly restrict the rearward visibility of a person operating the vehicle, as well as the visibility of anyone following the vehicle.

Various apparatus have been proposed in the past to reduce air drag, or increase streamlining, of vehicular bodies such as conventional box shaped trailers and the like. Examples of such are shown in the following U.S. Pat. Nos.: 2,146,297, issued to Huet; 3,010,754, issued to Shumaker; and 3,960,402, issued to Keck. One other patent which may be considered relevant to the present invention is U.S. Pat. No. 2,781,226, issued to Tydon. This patent contemplates cargo vehicle bodies which can be transported over a roadway as well as through the air via an airplane while maintaining a streamlined shape for air travel. However, the Tydon patent considers air drag unimportant for highway travel.

Other means and apparatus relevant to the field of air drag reduction, but more particularly relating to vehicles having aerodynamic shapes other than those pertinent to the present invention, and means and apparatus utilized to reduce air drag near the front end of a vehicle, are disclosed in the following patents: U.S. Pat. Nos. 780,124, issued to Monnier; 1,871,396, issued to Stalker; 2,036,560, issued to Backus; 2,877,046, issued to Funk; 3,425,740, issued to Vaughm; 3,834,752, issued to Cook et al.; 3,929,369, issued to Blair; 3,945,677, issued to Servais et al.; and France Pat. No. 724,951.

SUMMARY OF THE INVENTION

Air drag reducing apparatus for use with a vehicle having a substantially rectangular rear end, the apparatus generally comprising a pair of trim panels, each of which is pivotally connected along a leading edge thereof to the trailing edge of a respective side of the vehicle with a trailing edge thereof being positioned rearwardly of the vehicle. A control assembly is connected between each trim panel and the rear end of the vehicle for maintaining a respective trim panel in an operating position wherein the plane tangent to the trailing edge of the trim panel is within about 30° of the rearward projection of the leading edge thereof. Preferably, the control assemblies maintain the trim panels in the operating position only when the vehicle is moving forwardly at a rate exceeding a predetermined minimum velocity, while biasing the trim panels toward a storage position when the vehicle is stopped or moving forwardly at a rate less than the predetermined minimum velocity, with each trim panel substantially parallel to the rear end of the vehicle in the storage position.

An object of the present invention is to provide air drag reducing apparatus for inducing the air flowing along the sides of a vehicle into an area of lower pressure created rearwardly thereof when the vehicle is moving forwardly.

An object of one embodiment of the present invention is to provide an air drag reducing apparatus wherein trim panels are pivotally connected to the trailing edges of each side of a vehicle having a substantially rectangular rear end, with means for maintaining the trim panels within about 30° of the rearward projection of said trailing edges.

An object of another embodiment of the present invention is to provide the trim panels in the form of substantially flat, rectangular panels, or, alternatively, cylindric panels having an arcuate transverse section of not more than 30° arc.

Still another object of the present invention is to provide air drag reducing apparatus for substantially decreasing the amount of air induced upwardly from a roadway via the vehicle's slip stream, whereby air drag and the possibility of flying debris are significantly reduced.

Yet another object of the present invention is to provide air drag reducing apparatus for generally improving the overall stability and handling characteristics of the vehicle.

Other objects, advantages, and features of the present invention will be evident from the following detailed description when read in conjunction with the accompanying drawings which illustrate various embodiments of the invention.

BRIEF DESCRIPTION OF THE DRAWINGS

FIG. 1 is a partial plan view of a vehicle having the preferred embodiment of the drag reducing apparatus of the present invention connected thereto.

FIG. 2 is a rear elevational view of the vehicle and drag reducing apparatus shown in FIG. 1.

FIG. 2A is a block diagram depicting the connection of the panel actuator of FIG. 2 to a vehicle brake system;

FIG. 3 is a partial cross-sectional diagrammatical representation of a view taken generally along the line 3—3 of FIG. 2, but showing a variation of the drag reducing apparatus.

FIG. 4 is a partial plan view of a vehicle having another embodiment of the drag reducing apparatus of the present invention connected thereto.

FIG. 4A is a block diagram depiction of the panel actuator of FIG. 4.

DESCRIPTION OF THE PREFERRED EMBODIMENTS

Referring to the drawings in general and to FIGS. 1 and 2 in particular, shown therein and referred to by the reference number 10 is a vehicle having a substantially flat rear end 12, and a drag reducing apparatus 14 connected thereto which is constructed in accordance with a preferred embodiment of the present invention. More particularly, the vehicle 10 has opposite side walls 16, a top wall 18, and a chassis 20, partially supported above a roadway 22 for movement in a forward direction 24 via a rear wheel assembly 26. In general, the vehicle 10 will also include one or more groups of conventional brake indicator lights which are a portion of the brake light system 28 connected to the rear end 30 of the chassis 20, with mud flaps 32 depending downwardly from the chassis 20 rearwardly of each rear wheel assembly 26.

The drag reducing apparatus 14 is comprised primarily of a pair of trim panels 34, and a control assembly 36 connected between the rear end 12 of the vehicle 10 and each of the trim panels 34. Each trim panel 34 is pivotally connected along a panel leading edge 38 thereof to a trailing edge 40 of a respective sidewall 16 of the vehicle 10, with a panel trailing edge 42 of each trim panel 34 positioned rearwardly of the vehicle 10. Preferably, each trim panel 34 is connected to the respective sidewall 16 via hinge assemblies 44, or the like, and is sized to extend upwardly from near the brake indicator lights of the brake light system 28 to near the top wall 18, so as to form a substantially continuous, rearward extension of the sidewall 16. The width of the trim panels 34, that is the distance between the panel leading edge 38 and the panel trailing edge 42, may be varied to suit different vehicle configurations. However, it is preferred that the width be no greater than one-half the width of the rear end 12 of the vehicle 10.

Each trim panel 34 is selectively positionable via the control assembly 36 in either a storage position 46 or an operating position 48. In the storage position 46, the trim panel 34 will be positioned adjacent to, and substantially parallel with, the rear end 12 of the vehicle 10. In the operating position 48, the trim panel 34 will be positioned with the plane 50 tangent to the panel trailing edge 42 thereof within about 30° of the rearward projection 52 of the panel leading edge 38.

In a preferred form, each of the control assemblies 36 is comprised primarily of a positive-action panel actuator 54A connected between an associated trim panel 34 and an adjacent portion of the vehicle 10. In the form shown in FIGS. 1 and 2, the panel actuator 54A is a ram 56 which is responsive to the application of pressurized fluid or air by the operator of the vehicle 10. If desired, the ram 56 of the panel actuator 54A can be connected to the conventional pressurized fluid braking system of the vehicle 10 so as to automatically move the trim panel 34 toward the storage position 46 in response to the actuation of the braking system by the operator. In FIG. 2A, the vehicle pressurized fluid braking system is depicted by the block diagram 57 which has fluid communication with the ram 56 of the panel actuator 54A via conduit 59. Since such fluid connection as that depicted in FIG. 2A uses conventional fluid devices, further connective detail is not necessary in the present disclosure.

In an alternate form shown in FIG. 4, the panel actuator 54A is replaced by a panel actuator 54B which is a motor-driven screw assembly 58 which may be actuated by the operator of the vehicle 10 to move the trim panel 34 between the operating position 48 and the storage position 46. As depicted schematically in FIG. 4A, the screw assembly 58 comprises a threaded shaft portion 58A which is positionable by a motor portion 58B. If desired, the motor 58B of the screw assembly 58 of the panel actuator 54B can be electrically connected to the brake lighting system 28 of the vehicle 10 so as to be automatically responsive to the engagement of the braking system by the operator, as depicted in FIG. 4A which is a schematical depiction of the conventional brake light system 28 electrically connected via a connector 58C to the motor 58B of the screw assembly 58.

In a third form shown in FIG. 3, each control assembly 36 is comprised primarily of a passive biasing assembly 60 constructed to continuously bias the associated trim panel 34 toward the storage position 46, even when the vehicle 10 is moving in the forward direction 24. However, as the vehicle 10 moves forwardly at an increasing rate, the draft naturally induced rearwardly of the rear end 12 of the vehicle 10 exerts a rearward force on the trim panels 34 against the biasing force provided by the biasing assemblies 60. Preferably, the biasing force exerted by the biasing assemblies 60 is selected so that the trim panels 34 will be drawn outwardly toward the operating position 48 as the vehicle 10 approaches a predetermined minimum velocity. Once the trim panels 34 have achieved the operating position 48, the biasing assemblies 60 will maintain the trim panels 34 in the operating position 48 even though the velocity of the vehicle 10 thereafter exceeds the predetermined minimum velocity. However, as soon as the velocity of the vehicle 10 drops below the minimum velocity, the biasing force exerted by the biasing assemblies 60 will exceed the naturally induced draft forces, thereby moving the trim panels 34 toward the storage position 46.

With reference to the form shown in FIG. 3, each of the biasing assemblies 60 is comprised primarily of a sleeve 62 connected to an associated trim panel 34 adjacent to the panel trailing edge 42 thereof, with a biasing element 64 disposed therein. The biasing element 64 is connected to a medial portion of the rear end 12 of the vehicle 10 via a cable 66 extending through a reduced-diameter, low-friction grommet 68 or the like secured in the upper end of the sleeve 62. The biasing element 64 may be a spring 70 having the lower end thereof connected to the lower end of the sleeve 62 and the upper end thereof connected to the cable 66. Alternatively, the biasing element 64 may be a simple weight (not shown) having a diameter less than the diameter of the sleeve 62 but greater than the diameter of the grommet 68. In either form, the cable 66 may be provided with sufficient length to allow the trim panels 34 to be swung outwardly from the rear end 12 when necessary for loading and unloading the vehicle 12. In addition, a low friction pulley 71 may be connected to the trim panel 34 above the sleeve 62, to facilitate in smooth operation of the biasing assembly 60.

In whatever form is selected for the control assembly 36, it is preferred that a restraining link 72 be connected between the trailing edge 42 of each trim panel 34 and a medial portion of the rear end 12 of the vehicle 10 to prevent inadvertent movement of the trim panel 34 beyond the operating position 48. In addition to preventing excessive strain on the cooperating actuating or biasing assembly 54 or 60, the restraining link 72, which is preferably in the form of a chain 74, may be provided with a removable connector 76, either at one end or at a medial portion thereof, to facilitate disconnection and rotation of the trim panels 34 away from the rear end 12 for loading and unloading of the vehicle 10.

In the form shown in FIGS. 1 and 2, each trim panel 34 is in the form of a rectangular panel 78 having a substantially flat transverse section. In this form, the plane 50 tangent to the panel trailing edge 42 of the trim panel 34 will be coplanar with the trim panel 34 and, thus, will intersect the rearward projection 52 of the panel leading edge 38 at the panel leading edge 38. As noted in U.S. Pat. No. 3,960,402, it is known that the angle 80 between the plane 50 and the projection 52 should not exceed about 30° when the trim panel 34 is in the operating position 48, in order to maximize efficiency without inducing air separation. Thus, the operating stroke of the control assembly 36, and the length of the restraining link 72, should be selected to maintain the angle 80 within about 30° when the trim panel 34 is in the operating position 48.

In the form shown in FIGS. 3 and 4, each trim panel 34 is in the form of a cylindric panel 82 having an arcuate transverse section. However, to preclude air separation the plane 84 tangent to the panel trailing edge 42 of the trim panel 34 should still be maintained within about 30° of the rearward projection 86 of the leading edge 38 as indicated by the angle 87. Assuming that the point 85 is the center of curvature of the panel 82 in the operating position 48 thereof, it can be demonstrated geometrically that the plane 84 tangent to the panel trailing edge 42 of the trim panel 34 will be within about 30° of the rearward projection 86 of the panel leading edge 38 when the arcuate transverse section of the panel 34, that is the angle 88, is 30°. Thus, a cylindric panel 82 having an arcuate transverse section of not more than 30° of arc is sufficient to facilitate smooth inward flow of the air passing over the trim panel 34.

In FIG. 3, a lower extension 90 is connected via a suitably shaped connector 92 to the trim panel 34 and extends downwardly toward the roadway 22. In this form, the effective length of the trim panel 34 is significantly increased, resulting in a significant reduction in up-draft from the roadway 22. However, a slot 94 defined between the trim panel 34 and the lower extension 90 assures visibility of the brake indicator lights of the brake light system 28 regardless of the position of the trim panel 34.

Although the drag reducing apparatus 14 has been described herein as including a control assembly 60 which automatically controls the movement of the trim panels 34 between the operating position 48 and the storage position 46, it will be clear to those skilled in the art that the control assemblies 60 could be constructed to maintain the trim panels 34 in the operating position 48 at all times, except when the vehicle 10 is being loaded or unloaded. In addition, various other changes may be made in the construction of the arrangement of the parts or elements of the various embodiments as disclosed herein without departing from the spirit and scope of the present invention as defined in the following claims.

What is claimed is:

1. Drag reducing apparatus for use with a vehicle having a substantial rectangular rear end, comprising:
   a trim panel having a panel leading edge and a panel trailing edge, the panel leading edge pivotally connected along and coterminous with the trailing edge of the one side of the vehicle, the trim panel positioned to extend rearwardly of said vehicle so that the panel trailing edge is positioned rearwardly of the vehicle; and
   control means connected between the rear end of the vehicle and the trim panel for maintaining the trim panel in an operating position in which a forward projection of the plane tangent to the panel trailing edge intersects the rearward projection of the panel within about 30 degrees and rearwardly to the vehicle rear end.

2. The apparatus of claim 1 wherein the control means are defined further as comprising:
   a ram connected between the rear end of the vehicle and the trim panel.

3. The apparatus of claim 2 wherein the ram is connected to the braking system of the vehicle, whereby the trim panel automatically moves toward the storage position in response to actuation of the braking system.

4. The apparatus of claim 1 wherein the control means are further characterized as maintaining the trim panel in the operating position only when the vehicle is moving forwardly at a rate exceeding a predetermined minimum velocity.

5. The apparatus of claim 4 wherein the control means are further characterized as biasing the trim panel toward a storage position wherein the trim panel is adjacent to, and substantially parallel with, the rear end of said vehicle, except when the vehicle is moving forwardly at a rate exceeding the predetermined minimum velocity.

6. The apparatus of claim 5 wherein the control means are defined further as comprising:
   a sleeve connected to the trim panel adjacent to the trailing edge thereof;
   a cable having one end thereof connected to the rear end of the vehicle; and
   a biasing element disposed in the sleeve and connected to one other end of the cable.

7. The apparatus of claim 6 wherein the biasing element is a spring connected between said other end of the cable and a lower end of the sleeve.

8. The apparatus of claim 1 wherein the trim panel is further characterized as a rectangular panel having a substantially flat transverse section.

9. The apparatus of claim 1 wherein the trim panel is further characterized as a cylindric panel having an arcuate transverse section of not more than 30° of arc.

10. The apparatus of claim 1 wherein the control means includes means for preventing movement of the trim panel beyond the operating position.

11. Drag reducing apparatus for use with a vehicle having substantially rectangular rear end, comprising:
   a trim panel pivotally connected along a leading edge thereof to the trailing edge of one side of the vehicle, with a trailing edge of the trim panel positioned rearwardly of the vehicle; and
   control means connected between the rear end of the vehicle and the trim panel for maintaining the trim panel in an operating position with the plane tangent to the trailing edge of the trim panel within about 30° of the rearward projection of the leading edge, the control means comprising a motor-driven screw connected between the rear end of the vehicle and the trim panel.

12. The apparatus of claim 11 wherein the motor-driven screw is connected to the brake light portion of the braking system of the vehicle, whereby the trim panel automatically moves toward the storage position in response to the actuation of the braking system.

* * * * *